United States Patent [19]

Brokken

[11] Patent Number: 4,960,452

[45] Date of Patent: Oct. 2, 1990

[54] METHOD OF SUPPLYING NUTRIENTS TO PLANTS

[75] Inventor: Kyle A. Brokken, Eden Prairie, Minn.

[73] Assignee: Quali Tech, Inc., Chaska, Minn.

[21] Appl. No.: 185,120

[22] Filed: Apr. 22, 1988

[51] Int. Cl.$^5$ ................................................ C05F 5/00
[52] U.S. Cl. .................................. 71/26; 71/DIG. 2; 71/64.1
[58] Field of Search .................. 71/1, 8, 11, 23, 25, 71/26, DIG. 2, 64.1; 426/72, 74

[56] References Cited

U.S. PATENT DOCUMENTS

| | | | |
|---|---|---|---|
| 2,868,724 | 1/1959 | Zech | 210/58 |
| 3,062,878 | 11/1962 | Karabinos | 260/528 |
| 3,074,927 | 11/1963 | Saltman et al. | 260/209 |
| 3,661,960 | 5/1972 | Carlson | 260/439 R |
| 3,764,341 | 10/1973 | Carbonniere | 426/74 |
| 3,769,222 | 10/1973 | Yurko et al. | 252/89 |
| 3,876,810 | 4/1975 | Carbonniere | 426/74 |
| 4,661,358 | 4/1987 | Brokken | 426/72 |

OTHER PUBLICATIONS

Low Molecular Weight Complexes of Zinc and Other Trace metals in Lettuce Leaf, *Journal of Agricultural Food Chemistry*, 35, 721–727, Collin D. Walker and Ross M. Welch.

Brewex Technical Bulletin, ARM, Inc., Crystal Lake, IL (no date).

Kirk-Othmer, *encyclopedia of Chemical Technology*, Standen et al., eds., John Wiley & Sons, Inc., New York, NY (2nd ed. 1964) p. 309.

Mehltrelter, et al., "New Low Cost Sequestrants", *Soap and Chemical Specialities*, Aug. 1959, pp. 49–50 and 106.

*Primary Examiner*—Ferris H. Lander
*Attorney, Agent, or Firm*—Merchant, Gould, Smith, Edell, Welter & Schmidt

[57] ABSTRACT a method of providing nutrients to plants is provided comprising application to the foliage thereof of an aqueous composition including an effective amount of a nutrient complex comprising an alkali-modified brewer's wort incorporating an added nutrient divalent metal ion, sequestered by said wort.

19 Claims, No Drawings

METHOD OF SUPPLYING NUTRIENTS TO PLANTS

FIELD OF THE INVENTION

The present invention is directed to a method of providing nutrients to plants, particularly by providing divalent metal ions sequestered by brewer's wort to plant foliage or to the soil surrounding plants.

BACKGROUND INFORMATION

A common problem in the production of various types of crops is that of mineral deficiencies. The overuse of land used to grow crops, along with various growing conditions, can cause a lack of bio-available essential metal ions, often resulting in unhealthy plants. Plants suffering from mineral deficiencies do not grow efficiently, and therefore, the agricultural yields are often decreased.

In an attempt to raise the levels of metal ions in the crops, mineral supplements are often added to the soil. Examples of such mineral supplements include metal oxides, metal sulfates and metal chelates (such as EDTA complexes). Metal oxides and metal sulfates are only effective against metal deficiencies in certain types of soil. Often the metal ions become irreversibly attached to the organic materials in the soil, and therefore, the plants cannot absorb the minerals. Thus, a plant can suffer from mineral deficiencies while growing in a mineral rich soil. Also, metal sulfates and metal chelates can be absorbed too rapidly, causing burning of the plants. EDTA chelates, which are sometimes more effective, are too expensive to be used in many applications.

In addition to the attempts to increase mineral levels in crops through supplements to the soil, aqueous solutions of metal ions have been sprayed directly onto the foliage of the growing plant. By allowing the foliage of the plant to absorb the metal ions directly, the problems encountered with soil and metal ion interactions can be avoided. While some aqueous mineral sprays work adequately, severe burning of the foliage can occur. Such phytotoxicity is particularly prevalent when copper and iron compounds are sprayed onto foliage. The phytotoxicity is believed to be caused by an excessively rapid rate of mineral uptake by the foliage.

Therefore, a need exists for a method to safely, efficiently, and economically provide minerals or other micro-nutrients to plants. A need exists for such a method which includes either spraying the foliage with a nutrient composition or providing the nutrient composition to the soil surrounding the plant. A further need exists for a nutrient composition which releases the nutrients slowly, which is a ready source of bio-available metal ions or other nutrients, and which reduces soil/metal ion interactions.

SUMMARY OF THE INVENTION

The present invention is directed to a method of providing nutrients to plants by spraying the foliage thereof with an aqueous nutrient composition, or by applying a nutrient composition to the soil surrounding the plants, in either a dry or aqueous form. The aqueous composition comprises an effective amount of a nutrient complex comprising an alkali-modified brewer's wort incorporating an added nutrient divalent metal ion, which is sequestered by the wort. It is preferred that the nutrient complex be present in the aqueous composition at about 1.5-50 grams per liter. The nutrient metal ion is preferably present in the nutrient complex at about 1-15% by weight, and the nutrient metal ion is preferably present in the aqueous composition at about 0.25-5 g/liter.

The nutrient divalent metal ion is preferably selected from the group consisting of iron, cobalt, zinc, manganese, magnesium, copper, potassium and calcium. The aqueous composition is sprayed or otherwise applied onto the foliage of plants in an amount effective to treat or prevent a nutrient deficiency. The nutrient complex may also be applied in an effective amount directly to the soil with or without the pre-addition of an aqueous carrier medium.

DETAILED DESCRIPTION OF THE INVENTION

The present invention provides a safe and economical method of treating or preventing nutrient deficiencies in plants, specifically deficiencies in certain metals. Phytotoxicity, or the burning of plant foliage, is believed to be caused by the excessively rapid uptake of certain metal ions, either through the roots or through the foliage. The method of the invention utilizes a sequestered nutrient divalent metal ion, which is released at a slower rate than other commonly available sources of metal ions and can substantially reduce the incidence of phytotoxicity when applied to plants.

The substrate employed to sequester the divalent metal ions to form the sequestered nutrient compound or "complex" is alkali-modified brewer's wort. Compounds comprising metal ions sequestered in alkali-modified brewer's wort, which are useful in the method of the present invention, are described in U.S. Pat. No. 4,661,358, which is incorporated herein by reference.

The solid nutrient complex may be dissolved in an aqueous medium, usually water, preferably at concentrations of 1-100 grams/liter, most preferably 1.5-50 grams/liter. Using higher concentrations of sequestered nutrient complexes can be uneconomical.

The percentage of the metal ions present in the nutrient complex may also be varied. The complex should have a nutrient level which is effective to provide sufficient nutrients to the plant. The nutrient level should also be low enough so that the complex has the desired sequestering and slow release characteristics. These desired limits will vary with the type of plant, conditions of use, the metal ion or ions used, and the like. Thus, the nutrients may be present in the complex in a wide range of concentrations. Preferred concentrations of useful divalent metal ions are listed in Table I below.

TABLE I

| Metal | Weight Percent |
|---|---|
| Manganese | 1-15% |
| Iron | 1-15% |
| Copper | 1-15% |
| Magnesium | 1-15% |
| Calcium | 1-15% |
| Zinc | 1-15% |
| Cobalt | 1-15% |
| Potassium | 1-15% |

The optimal effective concentration of metal ions will also vary for different plants and different minerals. The preferred concentration of divalent metal ions in the aqueous nutrient composition is about 0.25-5 g/l. The optimal concentration of the nutrient and the frequency of treatment is, in part, determined by the extent of the nutrient deficiencies in the plant. A prophylactic effect can often be achieved with a single yearly dosage, provided by thoroughly soaking the leaves with the present aqueous composition.

Also, such a prophylactic effect can be achieved by the addition of a relatively small amount of the nutrient complex to the soil, typically 0.5-10 Kg/acre. However, when chlorosis or another more severe nutrient deficiency is evident, a much greater dosage is indicated. The foliage of the plant may be sprayed every few days or weeks as needed. Also, a larger dosage can be added to the soil. For example, a dosage on the order of 100-250 grams per citrus tree of a nutrient complex comprising sequestered iron at 10% may be necessary for treatment of a severe iron deficiency.

The method of the present invention is useful for supplying nutrients to a very wide variety of plants, including fruits and vegetables. One example is the necessity to supply metal ions to citrus trees. Most of the citrus, particularly in Florida, is grown on sandy soils which are inherently low in natural fertility. Sandy soils retain only small amounts of applied exchangeable plant nutrients due to the leaching action of rainfall and irrigation. Therefore, it is often necessary to fertilize citrus abundantly and regularly to obtain high production yields of good quality fruit. The spraying of citrus foliage, which is effective in improving some nutrient levels, is rarely used to provide certain metal ions, such as iron, because of the severe burning of the leaves which often results.

The method of the present invention is very effective in safely providing the necessary nutrients to plants, such as citrus. As mentioned above, the concentration of the metal ions and the frequency of application is dependent on a number of factors. For example in citrus, such factors include grove conditions, including soils, rootstocks, scions, tree age, previous fertilization, irrigation, the frequency of insect and disease control, and other factors. See, Koo, Recommended Fertilizers and Nutritional Sprays for Citrus, Bulletin 5360, University of Florida, Gainsville, Mar., 1984. Related factors determine the concentration and frequency of application of the present composition to other plants, as can be determined by one of skill in the art.

The aqueous nutrient composition used in the method of the invention is made by dissolving the nutrient complex which comprises wort-sequestered divalent metal salts (WSDMS), described in U.S. Patent No. 4,661,358, in a suitable amount of water or other nontoxic aqueous medium. The nutrient complex preferably includes a sequestering agent, a metal ion source, filler, and a surfactant, as described hereinbelow.

SEQUESTERING AGENT

The substrate employed to sequester the metal ions to afford the nutrient complex is alkali-modified brewer's wort. The term "brewer's wort" as employed with respect to the present compositions is intended to refer to products which are primarily brewer's wort and/or spent brewer's wort. Such a product is commercially available as an aqueous syrup comprising about 40-60% solids, e.g., as Brewex ®from Anheuser-Busch Breweries, St. Louis, Mo. The solids comprise a complex mixture of carbohydrates including higher sugars and polysaccharides such as starches and dextrins.

It has been found that the sequestering ability of the brewer's wort can be substantially increased by treating the liquid wort with an amount of alkali effective to adjust the pH of the wort to above about 8.0, preferably to a value of about 10-10.5 or above, most preferably to about pH 11-12, prior to contacting the wort with the metal ions. It is believed that the alkali treatment modifies the wort to create additional polar sites such as carboxylic acids and hydroxyl groups on the carbohydrate molecules present.

For example, a composition prepared to contain 30% wort solids and 40% copper sulfate will sequester 75-100% of the total copper ion when the liquid wort has been pre-adjusted to pH 11.0 while only 30-50% of the copper ion is sequestered by adjusting the pH of the wort to 7.0 prior to introducing the copper salt.

The alkali employed to modify the wort is preferably a basic alkali metal salt such as sodium hydroxide, potassium hydroxide and mixtures thereof.

METAL ION SOURCE

The metal ion component of the present compositions will be provided by a metal ion salt which can act as a nutrient with respect to plants. Such metallic "trace elements" include the water-soluble salts of the divalent ions of iron, cobalt, zinc, manganese, magnesium, copper, potassium, calcium and mixtures thereof. Preferably the sulfate salt of the metal ion is employed to form the present compositions.

The added metal salt or salts employed can vary widely depending upon those factors discussed above. Preferably the nutrient complex will comprise about 5-60% by weight of total metal salts.

FILLER

The nutrient complex preferably contains an amount of filler which is mixed with the semisolid wort-metal salt complex. Upon dewatering the mixture, a solid product is formed which can be ground to the desired particle size. Therefore any particulate, biologically inert filler can be employed in the present compositions, including inorganic fillers such as clays, silicates, diatomaceous earths and silicas such as fumed silica, silicon dioxide and the preferred hydrated silica.

SURFACTANT

The nutrient complex will also preferably contain an amount of a surfactant effective to enhance the dispersibility of the dried product in aqueous media. Preferred surfactants include nontoxic nonionic surfactants such as the condensation products of ethylene oxide with the partial fatty acid esters of sorbitol and sorbitol anhydride. These materials are commercially available from ICI Americas, Wilmington, Del., as the Tween ®series wherein the molar ration of ethylene oxide to the alcohol is about 15-25:1 and the fatty acid is a $C_{10}$-$C_{20}$ fatty acid, e.g. a laurate, stearate or oleate. For example, Tween ® 80 (CTFA:polysorbate 80) is a mixture of oleate esters of sorbitol and sorbitol anhydride, condensed with about 20 moles of ethylene oxide.

The total amount of nonionic surfactant which is incorporated into the nutrient complex is preferably about 1-10%, most preferably about 0.5-3% by weight.

Therefore, the present nutrient complex will comprise about 5-50%, preferably about 10-40%, brewer's wort; about 5-50% of total metal sulfate, about 0.5-3.0% of an alkali metal hydroxide; about 10-40%, preferably about 5–30%, filler and about 0.5–3% surfactant.

PREPARATION

To prepare the nutrient complex the liquid brewer's wort is placed in a liquid mixer and alkali added to adjust the pH of the wort to about 10–12. After a brief period of mixing at ambient temperatures, the wort is combined with the required amount of preblended metal salts, e.g. in a dry mixer. The particulate filler is then added to the resultant paste and mixing continued to yield a free-flowing damp powder. The powder is dried to a final moisture level of about 4–6%, and then ground and screened, e.g. to about 40–80 mesh. The surfactant is then blended with the ground product in a dry mixer and the finished product is packaged. These complexes dissolve readily in water and may be easily mixed to yield the desired concentrations as described herein above.

A number of different wort-sequestered divalent metal salts are commercially available from QualiTech, Inc, Chaska, Minn. under the trademark Carbomin ®. Each commercially available Carbomin ® product contains a different sequestered metal ion. Each Carbomin ® product is available at a fixed concentration of the metal ion, or may be specially ordered at other concentrations. For example, the standard Carbomin ® iron product contains 10% iron by weight. As used herein, the metal ion and concentration will be designated as, for example, Carbomin ® Iron(10%). Table II includes all presently available Carbomin ® products and the standard metal ion concentration.

TABLE II

| Complex | Standard Concentration |
| --- | --- |
| Carbomin ® Iron | 10% |
| Carbomin ® Zinc | 14.4% |
| Carbomin ® Manganese | 12% |
| Carbomin ® Magnesium | 5% |
| Carbomin ® Copper | 10% |
| Carbomin ® Cobalt | 13.2% |
| Carbomin ® Potassium | 10% |
| Carbomin ® Calcium | 10% |

The invention will be further described by reference to the following detailed examples.

EXAMPLE I

The effectiveness of the method of applying sequestered nutrient compositions to plants by spraying the foliage, to provide essential nutrients, was demonstrated as follows: Three nutrient sprays were prepared by dissolving (1) Carbomin ® Manganese (12%) in water (14.73 g/l) resulting in 1.77 g Mn/liter; (2) Carbomin ® Zinc (14.4%) in water (16.43 g/l) resulting in 2.37 g Zn/liter; and (3) Carbomin ® Iron (10.0%) in water (23.66 g/l) resulting in 2.37 g Fe/liter.

Each of the three solutions was sprayed on the 12" potted test Hamlin orange trees until all foilage was dripping with the solution. The control trees were not sprayed. No symptoms of phytotoxicity were noted following any treatments. After 6 months, the new growth of the treated and control trees was picked and analyzed for the concentration of the metal ions. The results are reported in Table II below.

TABLE III

| Element | Nutrient Spray | Control | % Increase over Control |
| --- | --- | --- | --- |
| Zinc, ppm | 51.8 | 40.0 | 30 |
| Manganese, ppm | 35.5 | 23.8 | 49 |
| Iron, ppm | 113.5 | 78.5 | 45 |

None of the foliage of the sprayed trees showed any signs of phytotoxicity.

EXAMPLE II

Iron sprays are typically not used on foilage because of the phytotoxicity which often results. The effectiveness and lack of phytotoxicity of the method of the invention was demonstrated. A grove of young orange trees [10 acres—4 to 6 feet tall] had been growing in very irregular shapes and growth was quite stunted. Many of the trees had yellow leaves with green veining. Analysis of the leaves revealed dry matter iron levels of 10 to 20 ppm. Less than 35 ppm iron is normally considered to be a deficient level. All other mineral levels were within optimal ranges.

A sequestered nutrient complex Carbomin ® Iron (10%) was dissolved in water at a concentration of 4.71 g/l (0.47 g/l Fe). The grove was sprayed with 192 liters/acre of the composition. A second application at the same levels was applied after new growth appeared.

After the first application, the new growth on the trees was sampled and assayed for dry matter iron. The assays revealed that the new leaves contained an acceptable iron level of 100 ppm. The leaves were dark green in color and there was no visible evidence of burning by the sequestered iron foliar spray treatment. The second application was completed as a prophylactic measure only. Later sampling of leaves continued to reveal dry matter iron levels in the 100 to 120 ppm range. The trees began to grow in a normal manner and the foliage was dark green in color with no evidence of phytotoxicity from the foliar treatment.

EXAMPLE III

To demonstrate that the method of the invention is not toxic to the mature leaves or fruit of citrus trees, eight young Hamlin orange trees were sprayed with the following foliar spray: (All trees were sprayed until all of the leaves were dripping.)

| Complex | Concentration |
| --- | --- |
| Carbomin ® Iron (10%) | 2.4 Fe/liter |
| Carbomin ® Zinc (14.4%) | 2.4 Zn/liter |
| Carbomin ® Manganese (12.0%) | 1.8 Mn/liter |

The morning after spraying, the plants were examined for leaf burn. It was noted that the very youngest (2 weeks old) leaves showed evidence of some burn. The older leaves (6 weeks and older) on the tree did not show any evidence of burning.

Citrus trees are not usually sprayed until the leaves are 6 weeks old. Based on the above information, the method of the invention utilizing foliar sprays of Carbomin ® Iron, Zinc and Manganese is safe for use on citrus at the indicated concentrations.

EXAMPLE IV

To demonstrate that the present nutrient compositions are not toxic to mature citrus leaves or fruit at increased concentrations, the following five, 4 liter suspensions of Carbomin ® Iron (10%) were prepared:

| Complex | Concentration of Fe |
| --- | --- |
| Carbomin ® Iron | 0.25 g Fe/liter |
| Carbomin ® Iron | 0.5 g Fe/liter |
| Carbomin ® Iron | 1.0 g Fe/liter |
| Carbomin ® Iron | 2.0 g Fe/liter |
| Carbomin ® Iron | 4.0 g Fe/liter |

On each of five trees, five near-mature fruit were dipped for 30 seconds into each of the 5 suspensions. Five varieties of orange trees were tested, including Hamlins, Pineapples, Temples, Murcotts, and Valencias.

All fruit were examined on Day 2, Day 3, and Day 6. No phytotoxicity symptoms were observed on any fruit. On the last day of inspection, Day 6, none of the Pineapple, Murcott, Temple, or Valencia fruit had fallen off. One Hamlin orange dipped in the 4 g/l suspension had fallen, but did not appear to be damaged by the spray.

Carbomin ® Fe at concentrations of up to 4 g/l proved safe on all mature fruit and leaves except the youngest, most tender leaves. Citrus fruit is considered to be even more susceptible than citrus leaves to foliar iron sprays.

EXAMPLE V

The comparatively slow uptake and lack of phytotoxicity of Carbomin ® Iron as compared to EDTA iron when used as a fertilizer for orange trees was demonstrated. Twenty small potted orange trees were planted. Ten of the pots were treated with Iron EDTA at 17 ppm Fe as a soil fertilizer (5 pots pH 5.6, 5 pots pH 7.5). Ten of the pots were treated with Carbomin ® Iron at 17 ppm Fe as a soil fertilizer (5 pots pH 5.6, 5 pots pH 7.5). Within one week of the treatments, the pots treated with EDTA Iron showed severe phytotoxicity symptoms in both the acid and alkaline soils. The Carbomin ® Iron pots showed no signs of phytotoxicity. This experiment demonstrates that the large quantities of Iron released by the EDTA Iron are made available to the plant very quickly. The Carbomin ® Iron did not release detrimental iron ion concentrations.

To demonstrate that Carbomin ® Iron is absorbed by the plant over an extended period of time, 20 small potted orange trees were planted. Ten of the pots were treated with Iron EDTA at 4.5 ppm Fe as a soil fertilizer (5 pots pH 5.6, 5 pots pH 7.5). Ten of the pots were treated with Carbomin ® Iron at 4.5 ppm Fe as a soil fertilizer (5 pots pH 5.6, 5 pots pH 7.5). Soil blanks were also prepared. The pots were watered on a regular basis over a six month period. The results are set forth in Table IV.

Table IV shows that the Carbomin ® Iron actually supplied more iron to the plants than did the EDTA Iron in both the acid and limed (basic) soil. The EDTA Iron significantly reduced growth in the acid soil compared to the control and Carbomin ® Iron pots.

TABLE IV

| Treatment | Leaf Fe, ppm | | Ht., cm. | | Wt., g. | | Soil pH | |
| --- | --- | --- | --- | --- | --- | --- | --- | --- |
|  | Acid | Limed | Acid | Limed | Acid | Limed | Acid | Lime |
| Control | 38.2 | 31.3 | 100.4 | 93.2 | 59.6 | 53.3 | 5.52 | 7.14 |
| Carbomin ® Iron | 41.2 | 36.8 | 100.6 | 92.2 | 58.5 | 51.8 | 5.56 | 7.46 |
| EDTA Iron | 35.8 | 34.4 | 72.5 | 92.6 | 39.8 | 55.0 | 5.70 | 7.35 |

What is claimed is:

1. A method of providing nutrients to plants comprising spraying the foliage with an aqueous composition including about 1.5–50 grams per liter of a nutrient complex comprising an alkali-modified brewer's wort incorporating about 0.25–5 grams per liter of an added nutrient divalent metal ion sequestered by said wort.

2. The method of claim 1 wherein said brewer's wort is alkali-modified by treatment with an alkali metal hydroxide.

3. The method of claim 1 wherein said divalent metal ion is derived from a metal sulfate salt.

4. The method of claim 1 wherein said divalent metal ion is selected from the group consisting of iron, cobalt, zinc, manganese, magnesium, copper, potassium, calcium and mixtures thereof.

5. The method of claim 1 wherein said composition further comprises an effective amount of a nonionic surfactant.

6. The method of claim 1 wherein said plant is a citrus tree.

7. A method of providing nutrients to citrus trees comprising spraying the foliage thereof with an aqueous composition including an effective amount of a nutrient complex comprising about 5–50% alkali-modified brewer's wort, about 1–60% of at least one nutrient divalent metal ion salt, about 0.5–3.0% of an alkali metal hydroxide, about 10–40% of an inorganic filler and about 0.5–3% of a nonionic surfactant, which is prepared by a process comprising:

(a) adjusting the pH of liquid brewer's wort to about 10–12 by the addition of an alkali metal hydroxide;

(b) combining the pH-adjusted wort with a divalent metal ion salt, wherein the metal ion is selected from the group consisting of iron, manganese, zinc, copper, cobalt, magnesium, potassium, calcium and mixtures thereof;

(c) drying the salt-wort mixture in admixture with an inorganic filler to yield a solid particulate product; and (d) blending said particulate product with a nonionic surfactant.

8. The method of claim 7 wherein said nutrient complex comprises about 1–15% manganese.

9. The method of claim 7 wherein said nutrient complex comprises about 1–15% iron.

10. The method of claim 7 wherein said nutrient complex comprises between about 1–15% zinc.

11. The method of claim 7 wherein said nutrient complex comprises about 1–15% manganese, 1–15% iron, and 1–15% zinc.

12. A method of providing nutrients to citrus trees consisting of applying to the soil surrounding the trees about 0.5–10 kg/acre a solid nutrient complex comprising an alkali-modified brewer's wort incorporating about 1–15% by weight of an added nutrient divalent metal ion which is sequestered by said wort.

13. The method of claim 12 wherein said brewer's wort is modified by treatment with an alkali metal hydroxide.

14. The method of claim 12 wherein said metal ion is derived from a metal sulfate salt.

15. The method of claim 12 wherein said divalent metal ion is iron.

16. The method of claim 12 wherein said composition further comprises an effective amount of a nonionic surfactant.

17. A method of providing nutrients to citrus trees comprising applying to the soil surrounding the trees an effective amount of a nutrient complex comprising about 5-50% alkali-modified brewer's wort, about 5-60% of at least one nutrient divalent metal ion salt, about 0.5-3.0% of on alkali metal hydroxide, about 10-40% of an inorganic filler and about 0.5-3% of a nonionic surfactant, which is prepared by a process comprising:
(a) adjusting the pH of liquid brewer's wort to about 10-12 by the addition of an alkali metal hydroxide;
(b) combining the pH-adjusted wort with a divalent metal ion salt, wherein the metal ion is selected from the group consisting of iron, manganese, zinc, copper, cobalt, magnesium and mixtures thereof;
(c) drying the salt-wort mixture in a mixture with an inorganic filler to yield a solid particulate product; and
(d) blending said particulate product with a nonionic.

18. The method of claim 17 wherein said sequestered nutrient complex comprises between about 1-15% iron.

19. A method of providing nutrients to citrus trees consisting of applying to the soil surrounding the trees about 100-250 grams/plant of a solid nutrient complex comprising an alkali-modified brewer's wort incorporating about 10% by weight of sequestered iron.

* * * * *

UNITED STATES PATENT AND TRADEMARK OFFICE
CERTIFICATE OF CORRECTION

PATENT NO. : 4,960,452
DATED : October 2, 1990
INVENTOR(S) : Kyle A. Brokken

It is certified that error appears in the above-identified patent and that said Letters Patent is hereby corrected as shown below:

Abstract, line 1, "a" should be --A--.

Column 5, line 62, "foilage" should be --foliage--.

Column 5, line 68, "II" should be --III--.

Column 6, line 13 "foilage" should be --foliage--.

Column 7, line 40-41, "phytoxicity" should be --phytotoxicity--.

Column 8, Table IV, "lime" should be --limed--; after "Control" insert --soil--.

Column 8, line 65, after "acre" insert --of--.

Signed and Sealed this

Twenty-eighth Day of April, 1992

Attest:

HARRY F. MANBECK, JR.

*Attesting Officer*     *Commissioner of Patents and Trademarks*